United States Patent
Motohashi et al.

(10) Patent No.: US 9,652,639 B2
(45) Date of Patent: May 16, 2017

(54) CARD HOLDING MEMBER AND CARD CONNECTOR

(71) Applicant: Molex, LLC, Lisle, IL (US)

(72) Inventors: Nobumasa Motohashi, Yamato (JP); Akihiro Shimotsu, Ebina (JP)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 15/000,118

(22) Filed: Jan. 19, 2016

(65) Prior Publication Data

US 2016/0248184 A1    Aug. 25, 2016

(30) Foreign Application Priority Data

Feb. 23, 2015   (JP) ................................ 2015-033212

(51) Int. Cl.
  *H01R 24/00*   (2011.01)
  *G06K 7/00*   (2006.01)

(52) U.S. Cl.
  CPC ...................................... *G06K 7/00* (2013.01)

(58) Field of Classification Search
  CPC ............................ H01R 12/721; H01R 13/635
  USPC ...................................... 439/630, 159, 928.1
  See application file for complete search history.

(56) References Cited

U.S. PATENT DOCUMENTS

| 8,021,175 B2 | 9/2011 | Kim | |
| 2004/0235353 A1* | 11/2004 | Katsumata | G06K 19/077 |
| | | | 439/630 |
| 2006/0240713 A1 | 10/2006 | Kikuchi et al. | |
| 2007/0197068 A1 | 8/2007 | Kikuchi et al. | |
| 2012/0129370 A1* | 5/2012 | Zhou | G06K 13/08 |
| | | | 439/188 |
| 2014/0113495 A1* | 4/2014 | Lim | H01R 27/00 |
| | | | 439/630 |
| 2016/0013571 A1* | 1/2016 | Ning | H01R 12/718 |
| | | | 439/630 |
| 2016/0036143 A1* | 2/2016 | Motohashi | G06K 13/08 |
| | | | 439/160 |
| 2016/0164205 A1* | 6/2016 | Nagase | G06K 13/00 |
| | | | 439/159 |
| 2016/0164225 A1* | 6/2016 | Nagase | H04B 1/3816 |
| | | | 439/159 |

FOREIGN PATENT DOCUMENTS

JP              3188646 U         1/2014

* cited by examiner

*Primary Examiner* — Abdullah Riyami
*Assistant Examiner* — Thang Nguyen
(74) *Attorney, Agent, or Firm* — James A. O'Malley

(57) ABSTRACT

A card holding member is provided for holding a card with terminal members and insertion into a card connector. The holding member comprises a frame portion containing a front frame portion in front of the holding member in the insertion direction and side frame portions connected on both ends to the front frame. The frame portion includes a metal portion composed of a metal panel and a resin portion covering at least some of the periphery of the metal portion. The front end surface of a front metal frame of the metal portion is exposed on the front end surface of the front frame. The front metal frame includes a subsiding portion. The front surface of the subsiding portion is flush with the front end surface of the front metal frame and includes a section displaced from the front end surface in the thickness direction of the front frame.

12 Claims, 16 Drawing Sheets

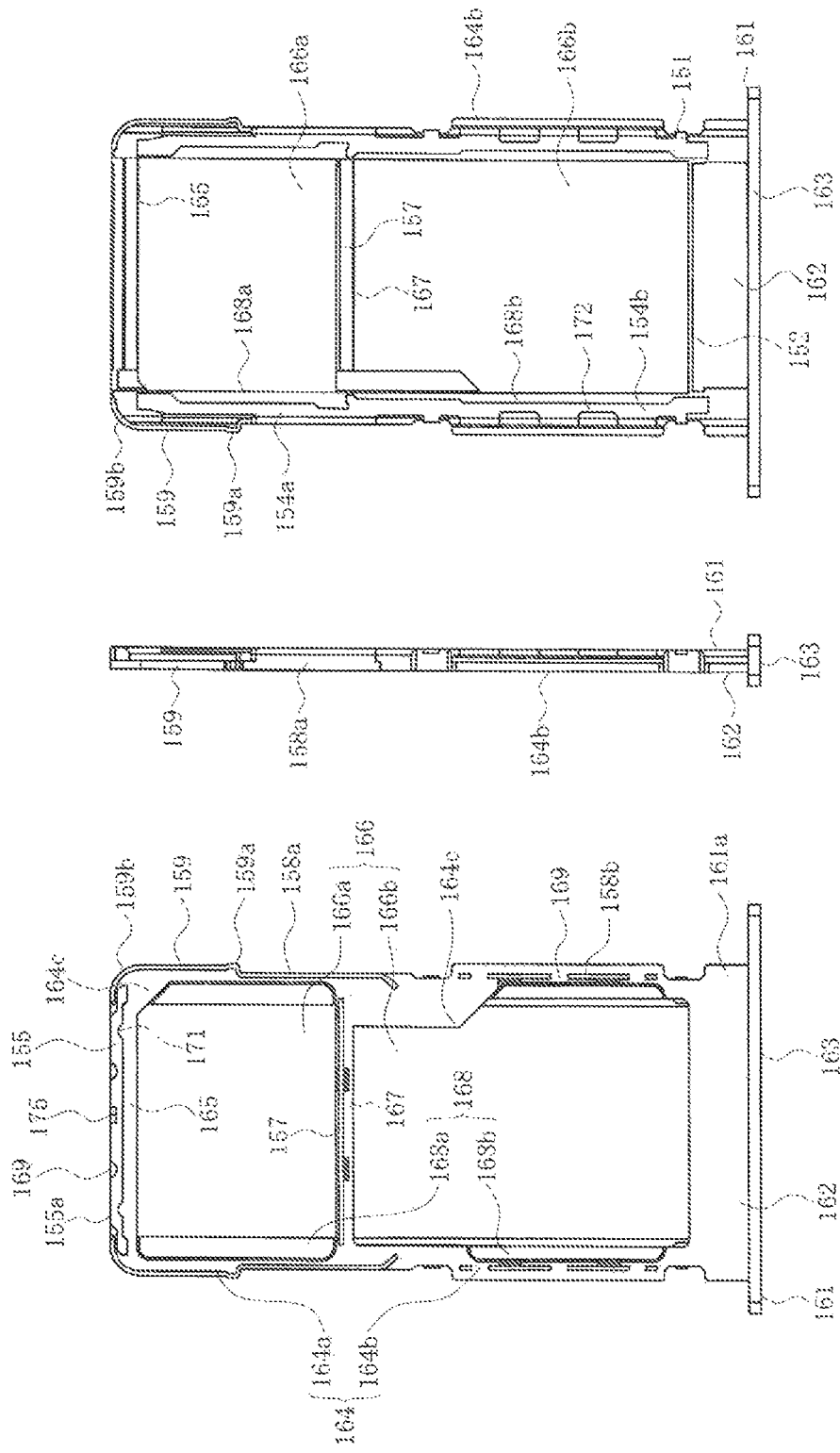

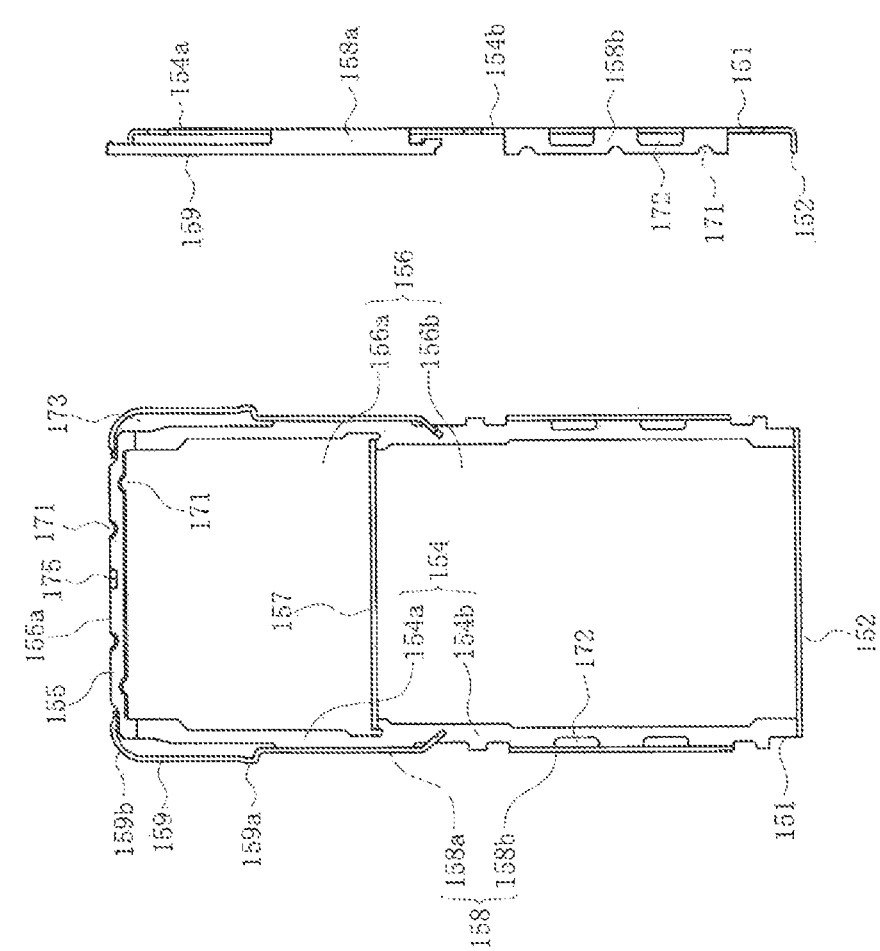

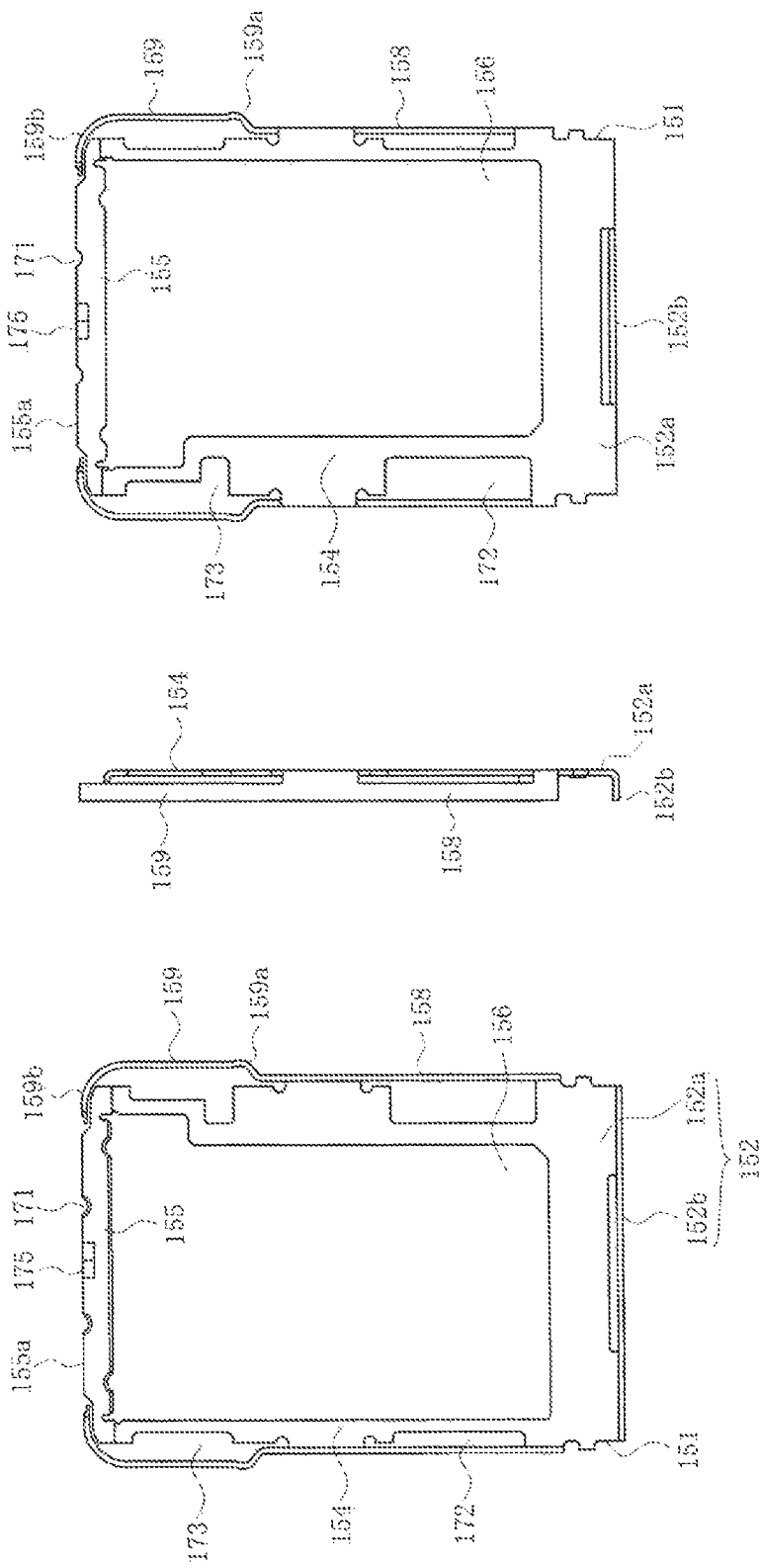

CARD HOLDING MEMBER AND CARD CONNECTOR

RELATED APPLICATIONS

This application claims priority to Japanese Application No. 2015-033212, filed Feb. 23, 2015, which is incorporated herein by reference in its entirety.

TECHNICAL FIELD

The present disclosure relates to a card holding member and to a card connector.

BACKGROUND ART

Electronic devices such as mobile phones include a card connector enabling the use of various types of cards such as SIM (Subscriber Identity Module) cards.

Electronic devices have become significantly smaller in recent years, and so have cards and card connectors. As a result, it can be difficult for users to grasp a card with the fingers and insert the card properly into a card connector. Therefore, card connectors have been proposed in which a card is set inside a card holder and the card holder is inserted into the card connector (see, for example, Patent Document 1).

FIG. 18 is a diagram showing a card connector of the prior art.

In this drawing, 811 is a housing for a card connector made of an insulating material. This housing has a plurality of connecting terminals that are not shown in the drawing. For the sake of convenience, the metal shell attached to the upper surface of the housing 811 is not shown in the drawing. In the drawing, 961 is the frame member of the card tray made from a resin material, and 966 is a space for accommodating a card (not shown). A card is housed inside the space 966 when the card tray is inserted into the housing 811 of the card connector. The card tray is held inside the housing 811 when a holding spring 875 arranged in the housing 811 engages a holding recessed portion 968 on the frame member 961.

When the card tray is to be removed from the housing 811, the user pushes the operating portion 822a of a sliding member 822 in the card connector, and the sliding member 822, resisting the spring action of a coil spring 825, is pushed into the housing 811 (the upper direction in the drawing). The engaging member 822b for engaging the front end of the sliding member 822 moves over a grooved heart cam formed on the upper surface of the sliding member accommodating portion 812 of the housing 811, and the force input portion 821b on one end of the ejection lever 821 is displaced into the housing 811.

The ejection lever 821 is attached to the housing 811 so as to be able to pivot on a fulcrum portion 821c. When the force input portion 821b is displaced into the housing 811, the force output portion 821a on the side opposite the force input portion 821b is displaced in the forward direction relative to the housing 811 (in the downward direction in the drawing). As a result, the front end of the frame member 961 of the card tray is pushed forward in the housing 811 by the force output portion 821a of the ejection lever 821.

Prior Art Documents—Registered Utility Model No. 3188646

SUMMARY

Because the card tray of the prior art is integrally molded from a resin material, the frame member 961 wears out after repeatedly being inserted into the card tray and ejected. When the card tray is made smaller and thinner in order to accommodate a small card, the strength of the card tray is poor and the card tray is easily damaged. Because the front end of the frame member 961 is pressed with great force by the force output portion 821a of the ejection lever 821, it is especially susceptible to wear and damage.

When these card trays are made of metal, they experience wear and damage such as scratching. This also reduces dimensional precision and increases manufacturing costs.

It is an object of the present disclosure to solve the problem associated with the prior art by providing a card holding member and a card connector for a card holding member which is strong, which does not experience wear or damage, and which is highly reliable.

The present disclosure is a card holding member able to hold a card with terminal members and able to be inserted into a card connector, the card holding member comprising: a frame portion containing a front frame portion positioned in the front of the card holding member in the direction of insertion into the card connector and side frame portions connected on both ends to the front frame portion, the frame portion including a metal portion composed of a metal panel and a resin portion covering at least some of the periphery of the metal portion; the metal portion including a metal frame portion, the front end surface of the front metal frame portion being exposed on the front end surface of the front frame portion; and the front metal frame portion including a subsiding portion, the front surface of the subsiding portion being flush with the front end surface of the front metal frame portion and including a section displaced from the front end surface in the thickness direction of the front frame portion.

In another card holding member of the present disclosure, the rear surface of the subsiding portion is parallel to the front surface and subsides into the resin portion of the front frame portion.

In another card holding member of the present disclosure, the upper surface of the subsiding portion subsides from the upper surface of the front metal frame portion.

In another card holding member of the present disclosure, the upper surface of the subsiding portion is a connecting surface, and is connected to the upper surface of the front metal frame portion.

In another card holding member of the present disclosure, the upper surface of the subsiding portion is not covered by the resin portion.

In another card holding member of the present disclosure, the front metal portion includes a boundary surface extending in the thickness direction of the front frame portion, and the boundary surface is connected to the rear end of the upper surface of the subsiding portion.

In another card holding member of the present disclosure, a gap is formed in the upper surface of the subsiding portion or between the same upper surface and the upper surface of the front metal frame portion.

In another card holding member of the present disclosure, the upper surface of the subsiding portion is covered by the resin portion.

The present disclosure is also a card connector able to receive one of the aforementioned inserted card holding members, the card connector having an abutting portion for abutting the front surface of the subsiding portion.

In another card connector of the present disclosure, the abutting portion is the force output portion of an ejecting member in an ejection mechanism for ejecting the card holding member.

The present disclosure is able to provide a card holding member and a card connector for a card holding member which is strong, which does not experience wear or damage, and which is highly reliable.

BRIEF DESCRIPTION OF THE DRAWINGS

FIGS. 1A and 1B are a pair of perspective views of the card tray in a first embodiment of the present disclosure in which FIG. 1A is a view from the upper rear and FIG. 1B is a view from the upper front.

FIGS. 2A, 2B and 2C are a set of three views of the card tray in the first embodiment of the present disclosure in which FIG. 2A is a view from above, FIG. 2B is a view from the side, and FIG. 2C is a view from below.

FIGS. 4A, 4B and 4C are a set of three views of the metal portion of the card tray in the first embodiment of the present disclosure in which FIG. 4A is a view from above, FIG. 4B is a view from the side, and FIG. 4C is a view from below.

FIGS. 5A and 5B are a pair of perspective views of the card connector in the first embodiment of the present disclosure in which FIG. 5A is a view with the shell attached and FIG. 5B is a view with the shell removed.

FIGS. 7A, 7B and 7C are a set of diagrams used to explain the positional relationship between the force output portion of the ejection lever and a card tray when the card tray has been inserted into the card connector in the first embodiment of the present disclosure in which FIG. 7A is a top view with the shell removed, FIG. 7B is a cross-sectional view from B-B in FIG. 7A, and FIG. 7C is an enlarged view of section C in FIG. 7B.

FIGS. 13A and 13B are a pair of perspective views showing the card tray and the metal portion of the card tray in a second embodiment of the present disclosure in which FIG. 13A shows the card tray and FIG. 13B shows the metal portion of the card tray.

FIGS. 14A, 14B and 14C are a set of three views of the card tray in the second embodiment of the present disclosure in which FIG. 14A is a view from above, FIG. 14B is a view from the side, and FIG. 14C is a view from below.

FIGS. 15A, 15B and 15C are a set of three views of the metal portion of the card tray in the second embodiment of the present disclosure in which FIG. 15A is a view from above, FIG. 15B is a view from the side, and FIG. 15C is a view from below.

FIGS. 16A and 16B are a pair of perspective views of the card connector in the second embodiment of the present disclosure in which FIG. 16A is a view with the shell attached and FIG. 16B is a view with the shell removed.

DETAILED DESCRIPTION OF THE PREFERRED EMBODIMENTS

Figure 1A:
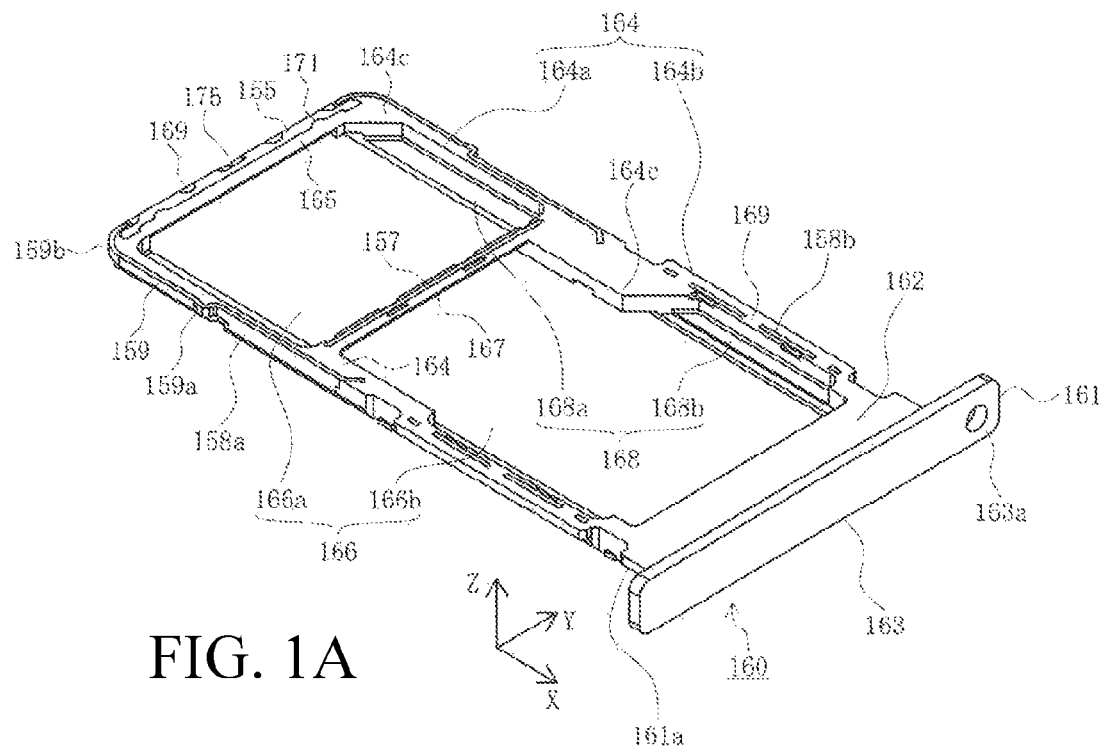
Figure 1B:
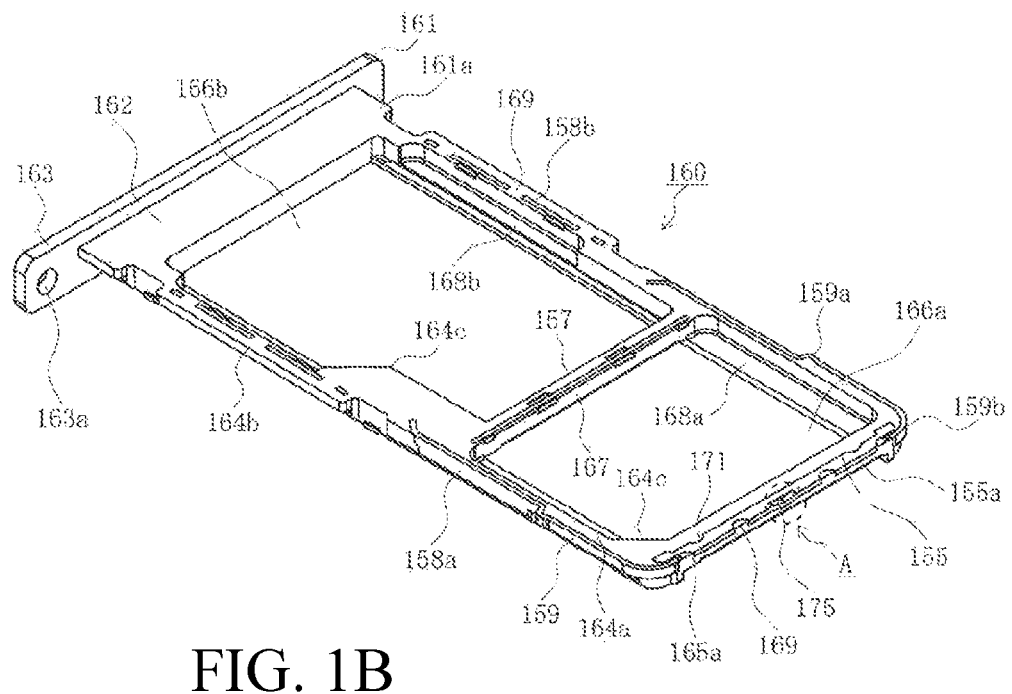
Figure 3:
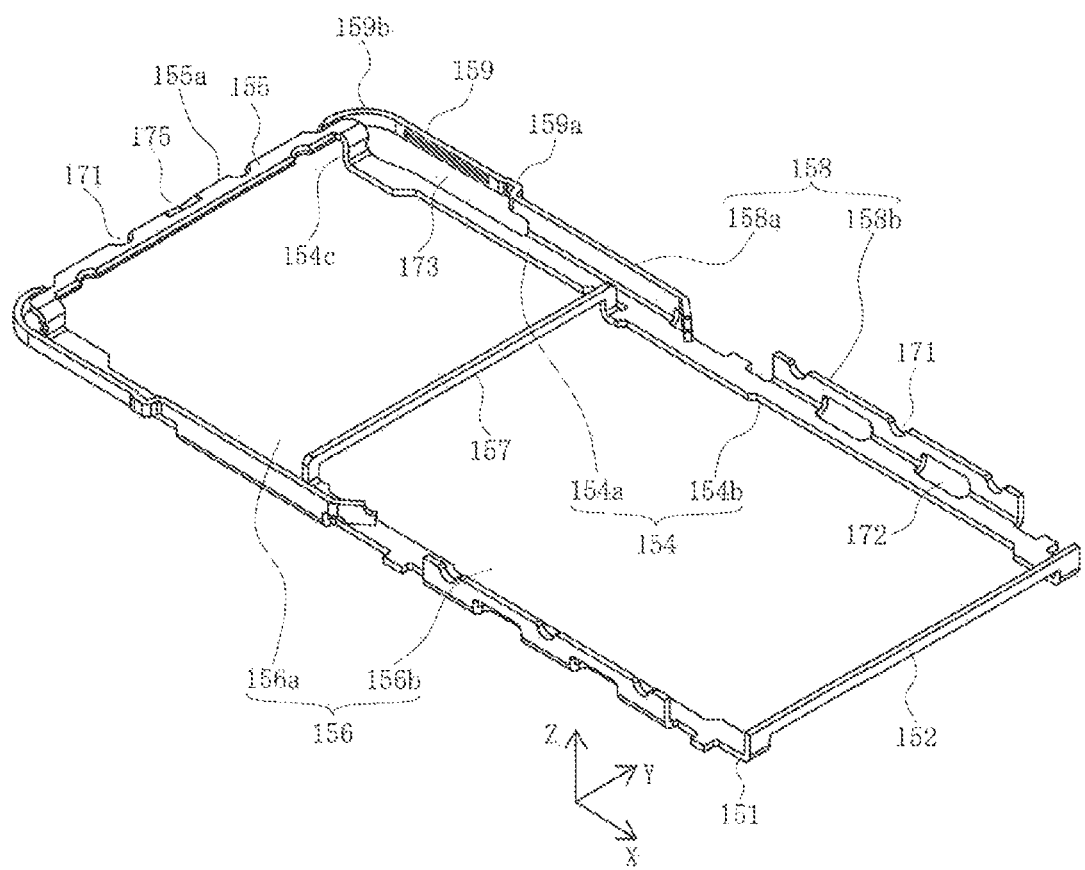
FIG. 3 is a perspective view of the metal portion of the card tray in the first embodiment of the present disclosure.

The following is a detailed explanation of embodiments of the present disclosure with reference to the drawings.

In the drawings, 160 is the card tray serving as the card holding member in the present embodiment. It is inserted into a card connector 1 mounted in an electronic device (not shown) while housing a card. The frame portion 161 of the card tray 160 has a space 166 serving as a card accommodating space, and a card is held inside the space 166. In other words, a card is accommodated inside the card tray 160 with both side surfaces surrounded by the frame portion 161 facing at least the side surfaces, and is mounted in an electronic device via a card connector 1. The electronic device may be any type of device, including a personal computer, a mobile phone, a smartphone, a communication modem, a tablet, a digital camera, a video camera, a music player, a gaming console, or a car navigation system.

In the card tray 160 of the present embodiment, the space 166 serving as the card accommodating space is divided into a first space 166a positioned in the front and a second space 166b positioned in the rear. A card can be accommodated in the first space 166a and the second space 166b. The same type of card or different types of cards can be accommodated in the first space 166a and the second space 166b. A card can be accommodated in either the first space 166a or the second space 166b with the other space remaining empty.

However, when a card connector other than the card connector 1 is mounted in an electronic device, the user may decide not to use the card connector 1. In this case, the user may insert the card connector 160 without a card, that is, an empty card connector 160, into the card connector 1 for storage.

The card can be any type of memory card such as a SIM card, a microSIM card, nanoSIM card, MMC® multimedia card, SD® secure digital card, miniSD® card, xDPicture® card, Memory Stick®, Memory Stick Duo®, Smart Media®, or Trans-Flash® memory card. In the explanation of the present embodiment, the card housed in the first space 166a is a nanoSIM card and the card housed in the second space 166b is a nanoSIM card or microSD® card. In accordance with the ETSI TS 102 221 V11.00 card standard, the nanoSIM card has a longitudinal length of 12.3 mm, a width of 8.8 mm, and a thickness of 0.67 mm. The SD Card Association, which is the standard setting body for SD® cards, has set the size of microSD® cards at 15 mm×11 mm×1.0 mm (L×W×D).

In the present embodiment, the card is housed inside the space 166 so that the surface including the electrode pads serving as the terminal members are facing downwards.

In the present embodiment, the expressions indicating direction, such as upper, lower, left, right, front and rear, which are used to explain the configuration and operation of each portion of the card connector 1 and card tray 160 are relative and not absolute. They depend on the orientation of the card connector 1, card tray 160, and their constituent components shown in the drawings. When the orientation of the card connector 1, card tray 160, or their constituent components changes, the interpretation changes in response to the change in orientation.

The card tray 160 is a substantially plate-like member including a metal portion 151 integrally formed by stamping and bending a metal plate, and a resin portion 161a made of an insulating resin covering and becoming integrated with a section of the metal portion 151 using a molding technique such as insert molding or overmolding.

The frame portion 161 of the card tray 160 is a rectangular frame member surrounding all four sides of a space 166 serving as the card accommodating space for accommodating a card. It has a rear frame portion 162 and a front frame portion 165 extending parallel to each other in the transverse direction (Y direction), and a pair of side frame portions 164 extending in the longitudinal direction (X direction) and connected to both ends of the rear frame portion 162 and the front frame portion 165. The frame portion 161 includes a middle frame portion 167 extending parallel to the rear frame portion 162 and the front frame portion 165 and connecting to the left and right side frame portions 164 to divide the space 166 into a first space 166a and a second space 166b. In the side frame portions 164, the section corresponding to the first space 166a is referred to as the first side frame portion 164a and the section corresponding to the second space 166b is referred to as the second side frame portion 164b.

A protruding portion 164c is formed in the front right corner of the first space 166a, more specifically, the front right corner where one of the first side frame portions 164a is connected to the front frame portion 165, and in the front right corner of the second space 166b, more specifically, the front right corner where one of the second side frame portions 164b is connected to the middle frame portion 167. These protruding portions 164c function as a card orientation restricting portions. When a card has the proper orientation, the card is allowed to be housed inside the first space 166a or the second space 166b. However, when the card does not have the proper orientation, the card is not allowed to be housed inside the first space 166a or the second space 166b. As a result, a card cannot be inserted into and housed in the first space 166a or the second space 166b inside the card tray 160 when oriented improperly, that is, when inserted upside-down or backwards.

A rear panel portion 163 is connected to the rear of the rear frame portion 162. A through-hole 163a is formed at one end of the rear panel portion 163 and passes through the rear panel portion 163 in the thickness direction. The through-hole 163a allows an auxiliary member such as a pin or rod to be inserted in order to apply pressure and operate the operating portion 22a of the push rod 22 in the card connector 1.

The upper surfaces of the rear frame portion 162, the side frame portion 164, and the front frame portion 165, excluding the rear side portion 163, are flush in the X-Y direction. However, the lower surface of the front frame portion 165 and the middle frame portion 167 in the X-Y direction are preferably higher than the lower surface of the side frame portions 164 in the X-Y direction. Also, the lower surface of the front frame portion 165 and the middle frame portion 167 are also preferably higher (in the Z direction) than the lower surface of a card held inside the first space 166a and the second space 166b. In this way, the front frame portion 165 and the middle frame portion 167 do not make contact with the primary terminals 51, secondary terminals 52 and tertiary terminals 53 when the card tray 160 is inserted into the card connector 1.

Eaves portions 168 extend into the space 166 from the lower ends of the left and right side frame portions 164. More specifically, first eaves portions 168a extend into the first space 166a from the lower ends of the left and right first side frame portions 164a, and second eaves portions 168b extend into the second space 166b from the lower ends of the left and right second side frame portions 164b. The first eaves portions 168a and the second eaves portions 168b function as card support portions for supporting at least some of the lower surface of the card held inside the first space 166a and the second space 166b, for example, near the front end, side ends, and rear end. The upper surface of the cards housed inside the first space 166a and the second space 166b is preferably flush with or slightly lower than the upper surfaces of the rear frame portion 162, the side frame portions 164, and the front frame portions 165.

The side surfaces of the front frame portion 165, the rear frame portion 162, and the first side frame portions 164a and the second side frame portions 164b, and the middle frame portion 167 facing the first space 166a and the second space 166b, that is, the inside surfaces, are all coated with an insulating resin so that the metal portion 151 is not exposed. Therefore, even though the peripheral edges of the electrode pads arranged on the lower surface of the cards housed inside the first space 166a and the second space 166b are exposed on the side surfaces of the cards, they do not come into contact with the metal portion 151.

The metal portion 151 is a frame member made from a 0.2 mm-thick metal plate with a substantially rectangular profile surrounding the four sides of the opening corresponding to the space 166, and includes a rear metal frame portion 152 and a front metal frame portion 155 extending in the transverse direction substantially parallel to each other, and a pair of metal side frame portions 154 extending on the longitudinal direction and connecting both ends of the rear metal frame portion 152 to both ends of the front metal frame portion 155. The metal portion 151 also includes a middle metal frame portion 157 extending parallel to the rear metal frame portion 152 and the front metal frame portion 155 and connecting to the left and right metal side frame portions 154 to divide the opening 156 into a first opening 156a corresponding to the first space 166a and a second opening 156b corresponding to a second space 166b. In the metal side frame portions 154, the section corresponding to the first opening 156a is referred to as the first metal side frame portion 154a and the section corresponding to the second opening 156b is referred to as the second metal side frame portion 154b.

The metal side frame portions 154 and the front metal frame portion 155 are flat members extending parallel to the upper and lower surfaces of the side frame portions 164 and the front frame portion 165, that is, extending in the X-Y direction. The rear metal frame portion 152 and the middle metal frame portion 157 are flat members extending in the Y-Z direction and curved upwards so as to be substantially orthogonal to the metal side frame portions 154. The front metal frame portion 155 is connected to the metal side frame portions 154 via a connecting portion 154c extending in the Y-Z direction, and is positioned above the metal side frame portions 154.

Metal side wall portions 158 curved upwards so as to be substantially orthogonal to the metal side frame portions 154 are connected to the outer edges of the metal side frame portions 154. The metal side wall portions 158 are flat members extending in the X-Z direction. In the metal side wall portions 158, the section positioned in the front is referred to as the first metal side wall portion 158a, and the section positioned in the rear is referred to as the second metal side wall portion 158b. A metal extended portion 159, which is a slender band-like member extending forward, is connected to the front end of the first metal side wall portions 158a. The metal extended portion 159 has a side wall tiered portion 159a formed on the rear end and a front end corner portion 159b formed on the front end. The metal extended portion 159 is a flat member extending entirely in the X-Z direction, the side wall tiered portion 159a is a section curved in the Y direction, and the front end corner portion 159b is a section curved in the Y direction and having a tip facing the Y direction. The upper edge of the front end corner portion 159b has a height substantially the same as the upper surface of the metal frame portions 155.

In the example shown in the drawing, a first anchoring recessed portion 171, which is a semicircular recessed portion, is formed in a plurality of spots on the front edge and rear edge of the front metal frame portion 155 and on the upper edge of the second metal side wall portions 158b. Each first anchoring recessed portion 171 is a section obtained by applying some of the resin portion 161a formed using a molding method such as insert molding and overmolding to form an anchor portion 169. Because this causes a so-called anchoring effect, the metal portion 151 and the resin portion 161a are more securely integrated. The number and locations of the first anchoring recessed portions 171 are not limited to the example shown in the drawing but are optional.

A first anchoring opening 172 is formed so as to pass through the metal portion 151 in the thickness direction in the boundary section between the second metal side wall frame portion 154a and the second metal side wall portion 158b, and a second anchoring opening 173 is formed between the first metal side frame portion 154a and the metal extended portion 159. Because some of the resin portion 161a molded using a molding method such as insert molding and overmolding is applied to the first anchoring opening 172 and the second anchoring opening 173, the anchoring effect more securely integrates the metal portion 151 and the resin portion 161a.

In the example shown in the drawing, the rear metal frame portion 152 is exposed so that the lower edge is flush with the lower surface of the rear frame portion 162, and the rest subsides in the rear frame portion 162 and the side frame portions 164. The middle metal frame portion 157 is exposed so that the upper edge and the lower edge are flush with both the upper surface and the lower surface of the middle frame portion 167, and the rest subsides in the middle frame portion 167 and the side frame portions 164. The metal side frame portions 154 are exposed so that the lower surface and the outer edge are flush with the lower surface and the outer surface of the side frame portions 164 and the rest subsides in the side frame portions 164. The second metal side wall portions 158b are exposed so that the upper edge and the lower outer side surface are flush with the upper surface and the outer side surface of the side frame portions 164 and the rest subsides in the side frame portions 164. The first metal side wall portions 158a and the metal extended portions 159 are exposed so that the upper edge, the lower edge, and the outer side surface are flush with the upper surface, the lower surface, and the outer side surface of the side frame portions 164 and the rest subsides in the side frame portions 164. The front end corner portions 159b are exposed so that the upper edge, the lower edge, and the outer side surface are flush with the upper surface, the lower surface, and the outer side surface of the connecting portion between the side frame portions 164 and the front frame portion 165 and the rest subsides into the connecting portion between the side frame portions 164 and the front frame portion 165.

In the present embodiment, a subsiding portion 175 is formed in the front metal frame portion 155. The subsiding portion 175 is formed where the abutting portion of a member of the card connector 1 abuts the front end surface 165a of the front frame portion 165 of the card tray 160 inserted into the card connector 1. The abutting portion can be the force output portion 21a of the ejection lever 21 serving as the ejecting member or a surface of the movable member 17 in the detection switch. Any section of a member in the card connector 1 which abuts the front end surface 165a of the front frame portion 165 of a card tray 160 inserted in the card connector 1 can be used. In the following explanation, the abutting portion is the force output portion 21a of the ejection lever 21 in the card connector 1. Also, there may be more than one subsiding portion 175. However, there is only one in the following explanation. In the example shown in the drawing, the subsiding portion 175 is formed near the center of the card tray 160 in the transverse direction (Y direction). However, it can be formed in any location that abuts the force output portion 21a of the ejection lever 21.

Figure 8:
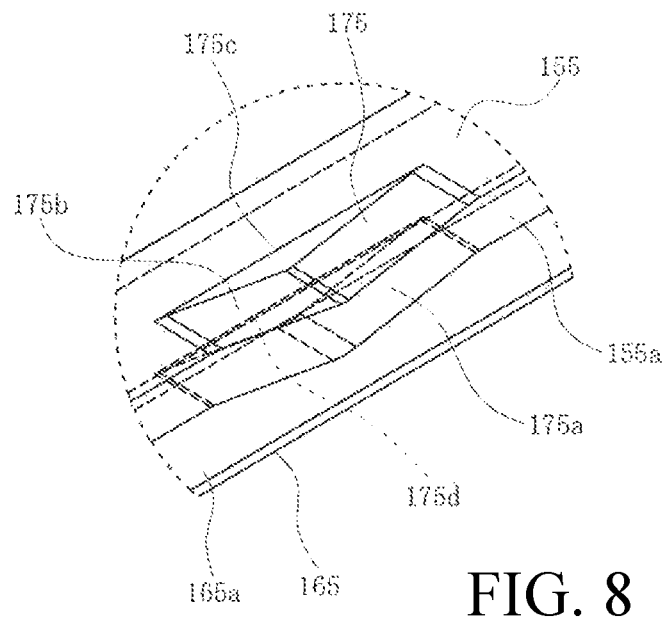
FIG. 8 is a partially enlarged view of the subsiding portion of the card tray in the first embodiment of the present disclosure taken from section A of FIG. 1B.

As shown in FIG. 8, the subsiding portion 175 has a V-notched section which has a V-shaped profile when viewed from the front and which has a downward insertion section near the front end surface 155a of the front metal frame portion 155. In other words, the subsiding portion 175 is a continuous, unbroken recessed portion with left and right descending portions when viewed from the front. The front surface 175a of the subsiding portion 175 is flush with the front end surface 155a of the front metal frame portion 155 and includes a section which is exposed to the front end surface 165a of the front frame portion 165 and which is displaced (downward) in the thickness direction of the front frame portion 165 from the front end surface 155a of the front metal frame portion 155. The upper surface 175b of the subsiding portion 175 is a pair of descending surfaces which are continuous and unbroken with the upper surface of the front metal frame portion 155.

In the example shown in the drawing, the dimension of the subsiding portion 175 in the X direction is half the dimension of the front metal frame portion 155 in the X direction excluding the subsiding portion 175. However, it may also be smaller or greater than half of the dimension of the front metal frame portion 155 in the X direction.

A boundary surface 175c extending vertically (in the Z direction) is formed in the subsiding portion 175 and where the front metal frame portion 155 meets the rear section of the subsiding portion 175. This boundary surface 175c is flat and triangular when viewed from the front, and is unbroken and continuous with the rear end of the upper surface 175b. In other words, there is no gap between the boundary surface 175c and the upper surface 175b. Therefore, the strength of the subsiding portion 175 and the front metal frame portion 155 including the subsiding portion 175 is greater in the X direction, and the subsiding portion 175 and the front metal frame portion 155 including the subsiding portion 175 are not deformed even when the front surface 175a is subjected to strong force in the X direction.

Figure 7A:
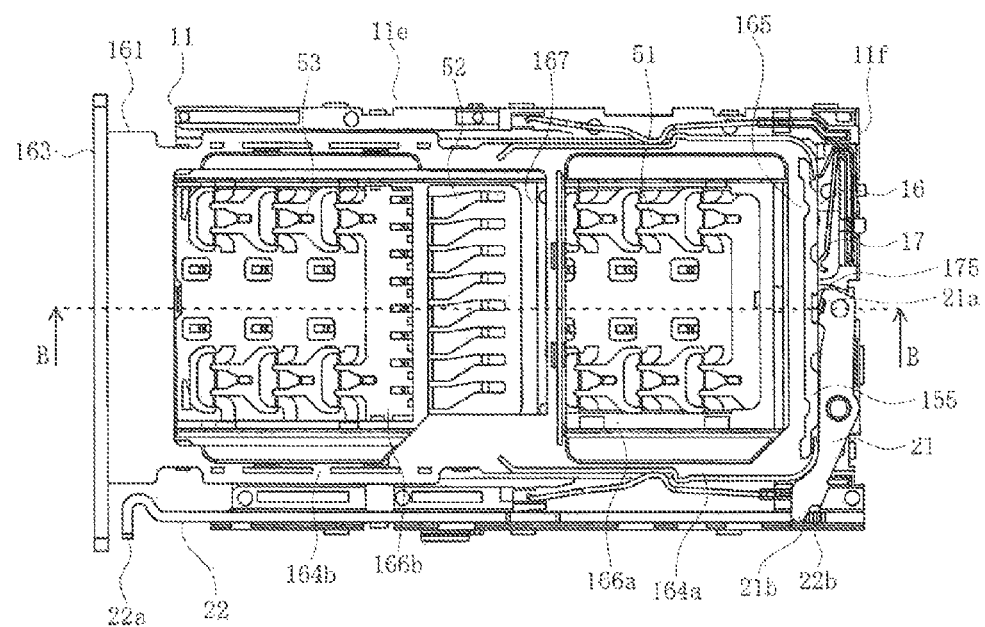
Figure 7B:
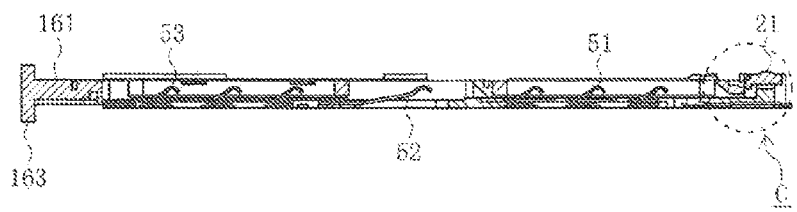
Figure 7C:
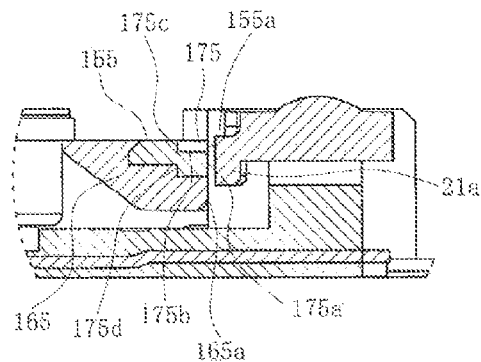

The rear surface 175d of the subsiding portion 175 is a flat surface parallel to the front surface 175a and is embedded in the resin portion 161a of the front frame portion 165. As shown in FIG. 7C, some of the resin portion 161a formed using a molding method such as insert molding or over-molding is applied to the rear of the rear surface 175 to provide an anchoring effect that more securely integrates the front metal frame portion 155 and the front frame portion 165.

The front metal frame portion 155 is exposed so that the upper surface excluding the subsiding portion 175 and the front end surface 155a are flush with the upper surface and the front end surface 165a of the front frame portion 165 and the rest is embedded in the front frame portion 165. The front end surface 165a of the front frame portion 165 must be strong and durable enough to be abutted by the force output portion 21a of the ejection lever 21 and to sustain force from the force output portion 21a in the direction of ejection. In the present embodiment, a subsiding portion 175 is formed where it can be abutted by the force output portion 21a of the ejection lever 21. Also, the outer surfaces and bottom surfaces of the side frame portions 164 have to be strong and durable enough to slide along the holding member 75 of the card connector 1 and the lower shell 12. Therefore, some of the metal side frame portion 154 is formed so that it remains exposed. As mentioned above, the sections of the metal portion 151 facing into the space 166 housing the cards are not exposed.

The metal portion 151 also includes flat plate-like members extending in the X-Y direction, X-Z direction, and Y-Z direction, and these members interpose the surfaces of the resin portion 161a extending in X-Y direction, X-Z direction, and Y-Z direction. This improves the adhesion between the metal portion 151 and the resin portion 161a and increases the intrinsic strength of the frame in the card tray 160. The middle metal frame portion 157 preferably improves the frame strength when there is a middle frame portion 167. However, this can be omitted when there is no middle frame portion 167.

Figure 5A:
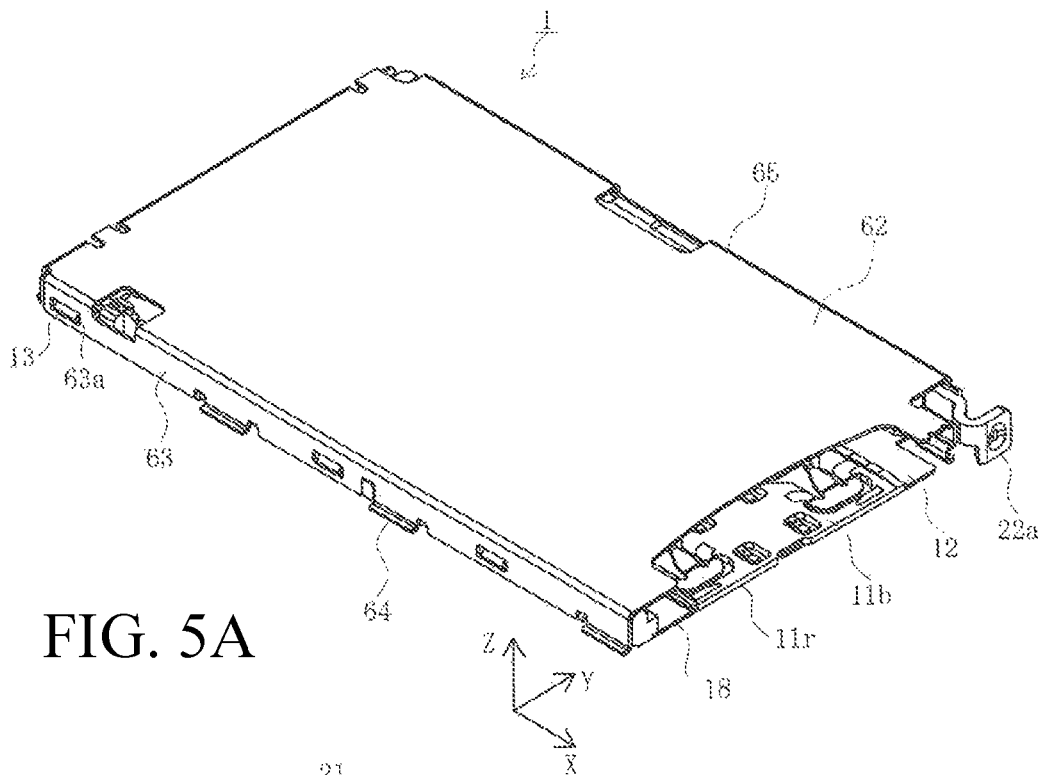
Figure 5B:
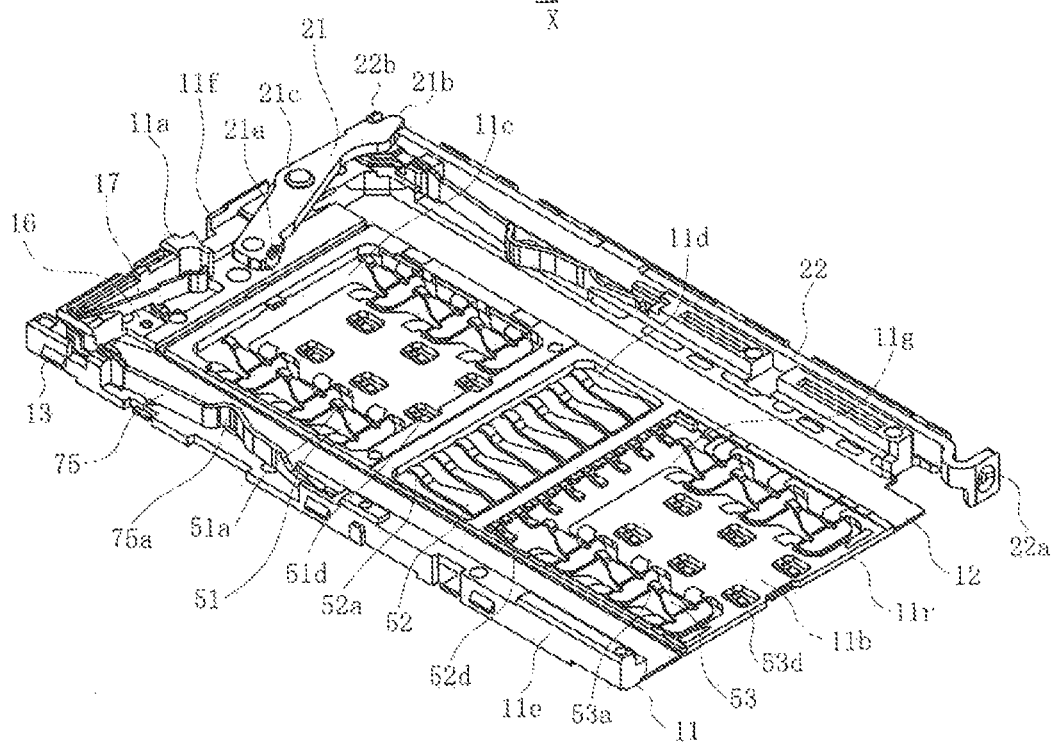
Figure 6:
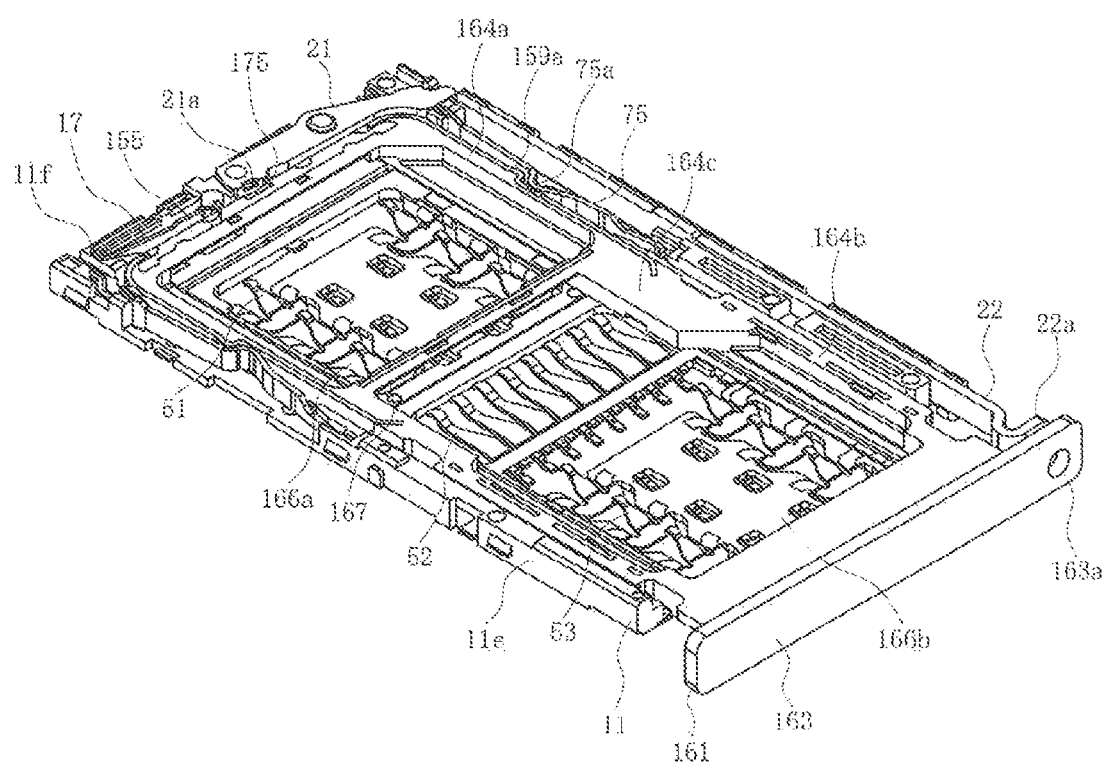
FIG. 6 is a perspective view of a card tray inserted into the card connector in the first embodiment of the present disclosure (with the shell removed).

In the present embodiment, as shown in FIGS. 5A and 5B, the card connector 1 has a housing 11 integrally molded from an insulating material such as a synthetic resin, and a shell 65 or cover member formed integrally by punching and bending a conductive metal sheet which is attached to the upper side of the housing 11. The shell 65 has a substantially rectangular ceiling panel portion 62 and side panel portions 63 erected on the side edges of the ceiling panel portion 62, and covers the housing 11 and at least some of the upper portion of the card tray 160 inserted into the housing 11 and the card connector 1. The card connector 1 has a substantially parallelepiped shape, and is mounted on the surface of a board such as a printed circuit board in the electronic device. A card tray 160 is inserted into the insertion slot 18 in the rear (below right in FIG. 5A). More specifically, the card tray 160 is inserted into the card insertion space between the housing 11 and the shell 65.

The housing 11 includes primary terminals 51, secondary terminals 52, tertiary terminals 53, and a lower shell 12 integrally formed by stamping and bending a metal plate. This substantially plate-like member is integrally molded using a molding technique such as insert molding or over-molding with an insulating resin which covers and becomes integrated with at least a portion of the primary terminals 51, secondary terminals 52, tertiary terminals 53, and a lower shell 12. The lower shell 12 is a frame member for reinforcing the housing 11, and is preferably formed from the same material as the primary terminals 51, secondary terminals 52 and/or tertiary terminals 53, but is electrically insulated from the primary terminals 51, the secondary terminals 52, and the tertiary terminals 53.

The housing 11 also includes a bottom wall portion 11b serving as the substantially rectangular, plate-like terminal holding portion, an inner wall portion 11a thicker than the bottom wall portion 11b which extends in the transverse direction (Y direction) of the housing 11 along the front end portion 11f in the insertion direction (X direction) of the card tray 160, and a pair of side wall portions 11e thicker than the bottom wall portion 11b extending in the insertion direction of the housing 11 along both side edges. The lower surfaces of the inner wall portion 11a and the side wall portions 11e are flush with the lower surface of the bottom wall portion 11b, and the upper surfaces are above the upper surface of the bottom wall portion 11b. The end portion of the housing 11 in the insertion direction of the card tray 160 is referred to as the rear end portion 11r.

Here, the bottom wall portion 11b includes a primary terminal holding recessed portion 11c, a secondary terminal holding recessed portion 11d, and a tertiary terminal holding recessed portion 11g for holding the exposed portions of the primary terminals 51, secondary terminals 52, and tertiary terminals 53. The primary terminal holding recessed portion 11c, secondary terminal holding recessed portion 11d, and tertiary terminal holding recessed portion 11g are openings which pass through the bottom wall portion 11b in the thickness direction.

The primary terminals 51 and tertiary terminals 53 are arranged side by side to form rows extending in the longitudinal direction of the housing 11. In the example shown in the drawing, there are two rows of three. At least a portion of each primary terminal 51 and tertiary terminal 53 is embedded in the bottom wall portion 11b, and at least a contact portion 51a, 53a is exposed inside the primary terminal holding recessed portion 11c and the tertiary terminal holding recessed portion 11g. Solder tail portions 51d, 53d to be soldered are also exposed on the bottom surface of the bottom wall portion 11b. The contact portions 51a and 53a are biased upwards by the spring action of the arm portion, and the arms of the primary terminals 51 and the tertiary terminals 53 come into contact with the corresponding electrode pad on the card inside the card tray 160 held inside the card connector 1.

Therefore, the secondary terminals 52 are arranged in a single row extending in the longitudinal direction of the housing 11. At least a portion of each secondary terminal 52 is embedded in the bottom wall portion 11b, and at least the contact portion 52a is exposed inside a secondary terminal holding recessed portion 11d. The solder tail portions 52d to be soldered are exposed on the bottom surface of the bottom wall portion 11b. The contact portions 52a are biased upwards by the spring action of the arm portions of the secondary terminals 52, and come into contact with the corresponding electrode pad on the card inside the card tray 160 held inside the card connector 1. Each solder tail portion 52d is connected electrically by solder to a signal line, contact pad, or terminal formed on a printed circuit board.

The primary terminals 51 and the third terminals 53 are arranged so as to match the electrode pads on a nanoSD® card, and the secondary terminals 52 are arranged so as to match the electrode pads on a microSIM® card. In other words, the card connector 1 can accommodate different types of cards housed in the card tray 160. For example, it can accommodate a card that is a microSD® card or a nanoSIM® card. The number and arrangement of primary terminals 51, secondary terminals 52, and tertiary terminals 53 can be changed if necessary to conform to the number and arrangement of electrode pads on a card.

The lower shell 12 is exposed between the bottom wall portion 11b and the left and right side wall portions 11e. A holding member 75 is formed on the inner side surface of each side wall portion 11e as a holding spring portion to hold and secure the card tray 160 inserted into the card connector 1. Each holding member 75 is a band-shaped member with spring action such as a metal plate and has a holding protrusion 75a bulging into the housing 11 in the transverse direction.

A push rod 22 is slidably mounted in the longitudinal direction on the inside surface of one of the side wall portions 11e. This serves as the tray ejection operation member in the tray ejection mechanism for ejecting the card tray 160 inserted into the card connector 1. The push rod 22 is a linear rod-shaped or band-shaped member, and a bent operating portion 22a is integrally connected to the rear end portion.

An engaging portion 22b is formed in the front end portion of the push rod 22 to engage the force input portion 21b of the ejection lever 21. The ejection lever 21 is a lever-shaped member arranged near the inner wall portion 11a, and functions as the tray ejection lever of the tray ejection mechanism. As a result, the ejection lever 21 is pivotally mounted on the bottom wall portion 11b at the fulcrum portion 21c. The end on the other side of the fulcrum portion 21c from the force input portion 21b functions as the force output portion 21a which comes into contact with the front end surface 165a of the front frame portion 165 of the card tray 160 inserted into the card connector 1 and applies force to the card tray 160 in the direction of ejection. More specifically, the force output portion 21a abuts the front surface 175a of the subsiding portion 175 in the front metal frame portion 155 exposed on the front end surface 165a of the front frame portion 165.

The shell 65 has side panel portions 63 extending from the side edges of a ceiling panel portion 62. A plurality of locking openings 63a are formed on the side panel portions 63. When the shell 65 is mounted on the upper side of the housing 11, the locking openings 63a are engaged by locking protrusions 13 formed on the outside surfaces of the side wall portions 11e of the housing 11, and the shell 65 is secured on the housing 11. Also, solder tail portions 64 are formed at any location on the lower end of the side panel portions 63. These serve as board-connectors and stand erect from the side panel portions 63 and extend outward in the transverse direction of the shell 65. The solder tail portions 64 are secured by soldering to anchoring pads formed on the surface of the board.

The housing 11 includes a movable member 17 and a fixed member 16 for a detection switch used to detect whether a card tray 160 inserted into the card connector 1 has reached a predetermined position inside the card connector 1 (the position at which the inserted card tray 160 is locked). When the card tray 160 has not reached the predetermined position, the movable member 17 and the fixed member 16 are in contact, and the detection switch is electrified or turned ON. However, when the card tray 160 reaches the predetermined position, the movable member 17 presses against the front frame portion 165 of the card tray 160, and the movable member 17 is separated from the fixed member 16. Because this de-electrifies or turns the detection switch OFF, it is determined that the card tray 160 has reached the predetermined position.

The following is an explanation of the operations performed by a card connector 1 with the configuration described above. First, the operations performed to insert the card tray 160 will be explained.

The user manually inserts a card tray 160 housing a card into the insertion slot 18 in the rear of the card connector 1. Here, the card tray 160 is inserted properly with the upper surface facing upwards towards the ceiling panel portion 62 of the shell 65, the lower surface facing downwards towards the bottom wall portion 11b of the housing 11, and the front frame portion 165 facing the front end portion 11f of the housing 11. As a result, the upper surface 11b of the card housed inside the space 166 which does not include any electrode pads faces upwards, and the lower surface including electrode pads and exposed on the lower surface of the card tray 160 is facing downwards. The card tray 160 can be inserted into the card connector 1 and ejected from the card connector 1 whether the tray is housing a card or not housing a card. In the following explanation, the tray is housing a card. As mentioned above, the card is a nanoSIM® card or microSD® card.

When the card tray 160 is inserted from the insertion slot 18 into the card insertion space formed between the housing 11 and the shell 65, the card tray 160 advances into the card insertion space with the lower surfaces of the side frame portions 164 approaching or making contact with the upper surface of the lower shell 12 or the outer surfaces of the side frame portions 164 sliding along the inner surfaces of the side wall portions 11e of the card connector. Because the bottom surfaces and the outer surfaces of the side frame portions 164 are partially exposed to the metal side frame portion 154, there is no wear or damage even when sliding along the inner surfaces of the inner wall portions 11e.

Next, when the user pushes in the card tray 160, the holding members 75 are elastically deformed and the holding protrusions 75a on the left and right holding members 75 are separated from each other. The holding protrusions 75a slide along the metal extended portions 159 exposed on the outer surfaces of the side frame portions 164 and move to the rear of the card tray 160 in a relative sense.

Next, when the user pushes in the card tray 160, as shown in FIG. 6 and FIGS. 7A, 7B and 7C, the card tray 160 reaches a predetermined position inside the card connector 1. At this time, the movable member 17 is pushed by the front frame portion 165 away from the fixed member 16, turning the detection switch OFF to indicate that the card tray 160 has reached the predetermined position inside the card connector 1. For explanatory purposes, a card is not depicted in FIG. 6 and FIGS. 7A, 7B and 7C.

Also, when the card tray 160 reaches the predetermined position inside the card connector 1, the holding protrusions 75a on the holding members 75 overcome the side wall tiered portions 159a formed in the rear end of the metal extended portions 159 and engage the side wall tiered portions 159a. In this way, the card tray 160 is held at the predetermined position inside the card connector 1 in a locked state. Because it is elastically held on the left and right by the holding members 75, the card tray 160 is kept from being displaced in the transverse direction.

As the card tray 160 advances to the predetermined position inside the card connector 1, the force output portion 21a of the ejection lever 21 is pushed by the front frame portion 165, more specifically, by the front end surface 155a of the front metal frame portion 155 exposed on the front end surface 165a of the front frame portion 165, and is displaced further in the direction of the front end portion 11f. As a result, the force input portion 21b of the ejection lever 21 is displaced farther in the direction of the rear end portion 11r, and the push rod 22 slides to the position protruding farthest to the rear.

When the card tray 160 reaches the predetermined position inside the card connector 1, the force output portion 21a of the ejection lever 21 is interfered with by the inner wall portion 11a of the housing 11 and cannot be displaced any further in the direction of the front end portion 11f. As a result, the card tray 160 cannot advance any further.

The card housed inside the card tray 160 can exchange data along with the card tray 160 at the predetermined position using an arithmetic processing means in the electronic device mounted in the card connector 1. When the card is held in the predetermined position, the contact portions 51a, 52a, 53a of the primary terminals 51, secondary terminals 52 and/or tertiary terminals 53 make contact with the electrode pads on the card and establish an electrical connection.

The following is an explanation of the operations performed to eject a card tray 160 from the card connector 1.

First, the user manually inserts an auxiliary member such as a pin or rod into the through-hole 163a formed in the rear panel portion 163 from the rear of the card tray 160, and the tip of the auxiliary member is brought into contact with the operating portion 22a of the push rod 22. When the user pushes in the push rod 22 via the auxiliary member, the force input portion 21b of the ejection lever 21 engaging the engaging portion 22b of the push rod 22 is displaced forward. As a result, the front frame portion 165 is pressed against the force output portion 21a of the ejection lever 21, and the card tray 160 moves towards the rear end portion 11r from the predetermined position. At this time, the card tray 160 is locked because the holding protrusions 75a on the holding members 75 are engaging the side wall tiered portions 159a of the metal extended portions 159. However, if the manual pressure applied by the user is sufficient, it is easily unlocked when the user pushes in the operating portion 22a of the push rod 22, and the card tray 160 moves towards the rear end portion 11r. As a result, the detection switch turns OFF, and movement of the card tray 160 to the rear of the predetermined position is detected.

In this way, the rear panel portion 163 of the card tray 160 protrudes sufficiently from the insertion slot 18 of the card connector 1. This allows the user to grasp the rear panel portion 163 and remove the card tray 160 from the card connector 1.

The front end surface 155a of the front metal frame portion 155 is exposed on the front surface of the front frame portion 165 to prevent damage when subjected to strong force from the force output portion 21a of the ejection lever 21.

However, as shown in FIG. 7C, the dimension of the force output portion 21a of the ejection lever 21 in the vertical direction (Z direction), that is, in the direction of thickness, is thinner than the thickness of the front frame portion 165. Also, because of inevitable dimensional errors in the vertical dimensions of the various components in the card tray 160 and the card connector 1, the positional relationship between the front frame portion 165 and the force output portion 21a of the ejection lever 21 in the vertical direction differs somewhat from the relationship shown in FIG. 7C. Also, because of mounting errors when the ejection lever 21 is mounted on the bottom wall portion 11b of the housing 11, the entire ejection lever 21 swings around the fulcrum portion 21c in the vertical direction and the force output portion 21a is displaced in the vertical direction. As a result, the position at which the force output portion 21a of the ejection lever 21 abuts the front end surface 165a of the front frame portion 165 is sometimes lower than the front end surface 155a of the front metal frame portion 155.

In the present embodiment, the subsiding portion 175 is formed in the front metal frame portion 155 where it abuts the force output portion 21a of the ejection lever 21 with respect to the transverse direction (Y direction). The front surface 175a of the subsiding portion 175 is flush with the front end surface 155a of the front metal portion 155 and the front end surface 165a of the front frame portion 165 and the front surface 175a includes a section with V-shaped descending portions in the vertical direction. Therefore, the range in which the front surface 175a of the subsiding portion 175 extends vertically is greater than the range in which the front end surface 155a of the front metal frame portion 155 excluding the subsiding portion 175 extends vertically and within the range in which the front end surface 165a of the front frame portion 165 extends vertically. As a result, the force output portion 21a of the ejection lever 21 abuts the front surface 175a of the subsiding portion 175 even when the force output portion 21a is lower than the front end surface 155a of the front metal frame portion 155.

Because the force output portion 21a of the ejection lever 21 abuts the front end surface 155a of the front metal frame portion 155 in this way, the front frame portion 165 is not damaged.

The following is an explanation of variations on the subsiding portion 175 in the present embodiment.

Figure 9:
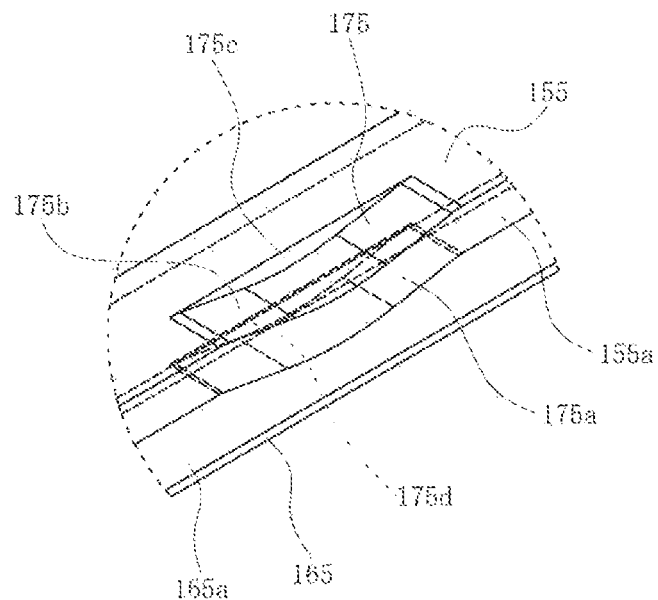
FIG. 9 is a partially enlarged view of the subsiding portion of the card tray in a first variation on the first embodiment of the present disclosure, as compared to FIG. 8.

The subsiding portion 175 shown in FIG. 9, which is the first variation, has a U-shaped profile when viewed from the front and the U-shaped portion allows for insertion downward. In other words, the subsiding portion 175 is a continuous and unbroken recessed portion having a curved section on both the left and right sides when viewed from the front. The upper surface 175b of the subsiding portion 175 descends on both sides and is curved in the middle section to form a continuous and unbroken curved surface. Because the rest of the configuration is identical to the subsiding portion 175 shown in FIG. 8, further explanation has been omitted.

Figure 10:
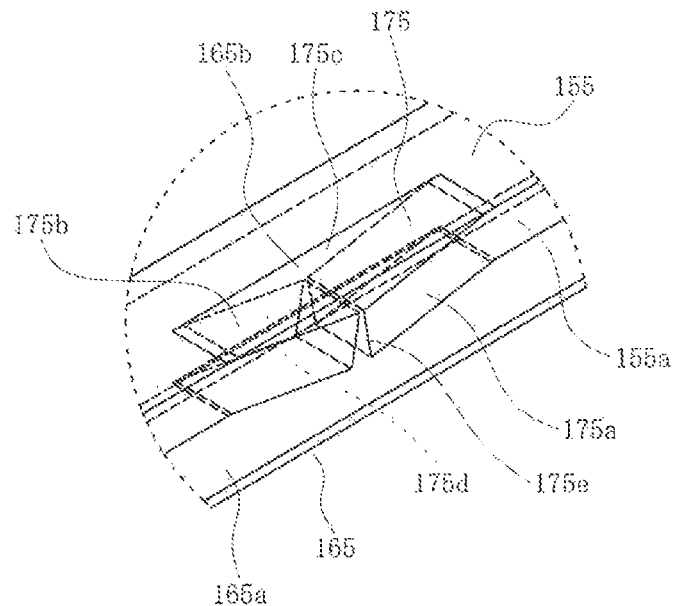
FIG. 10 is a partially enlarged view of the subsiding portion of the card tray in a second variation on the first embodiment of the present disclosure, as compared to FIG. 8.

The subsiding portion 175 shown in FIG. 10, which is the second variation, has a V-shaped profile when viewed from the front and the V-shaped portion allows for insertion downward. However, a gap 175e is formed between the inclined sections on both the left and right sides. The upper surface 175b of the subsiding portion 175 is a pair of descending inclined surfaces with a gap 175e between them. In other words, the gap 175e is in the upper surface 175b. Some of the resin portion 161a formed using a molding method such as insert molding or overmolding is applied to the gap 175e to cover the upper surface 175b with the resin portion 161a and form an embedded portion 165b on the upper surface 175b. The upper surface of the embedded portion 165b is flush with the upper surface of the front metal frame portion 155, and the front surface of the embedded portion 165b is flush with the front end surface 155a of the front metal frame portion 155 and the front end surface 165a of the front frame portion 165. Because the rest of the configuration is identical to the subsiding portion 175 shown in FIG. 8, further explanation has been omitted.

Figure 11:
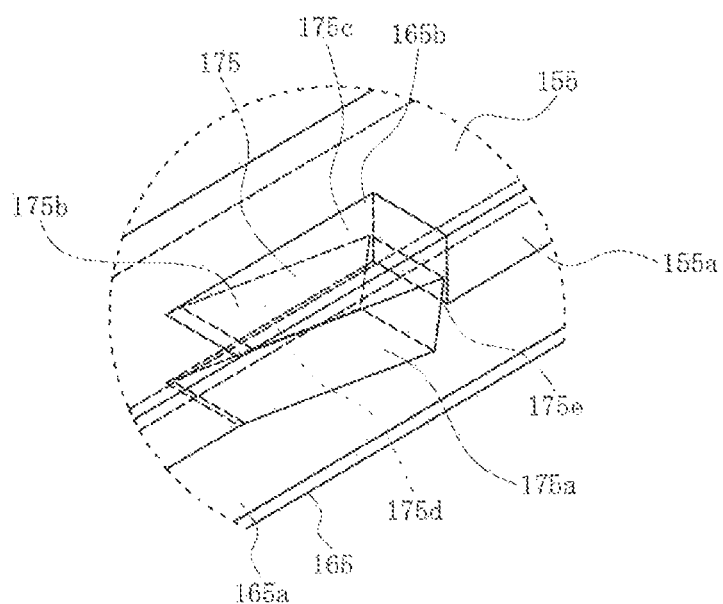
FIG. 11 is a partially enlarged view of the subsiding portion of the card tray in a third variation on the first embodiment of the present disclosure, as compared to FIG. 8.

The subsiding portion 175 shown in FIG. 11, which is the third variation, has a linear portion for downward inclined insertion from a base end (the left end in the example shown in the drawing) to the leading end (the right end in the example shown in the drawing) when viewed from the front. The base end is connected to the front metal frame portion 155 and the leading end is cut off from the front metal frame portion 155, and a gap 175e is formed between the leading end and the front metal frame portion 155. In other words, a gap 175e is present between the upper surface 175b and the upper surface of the front metal frame portion 155. Some of the resin portion 161a formed using a molding method such as insert molding or overmolding is applied to the gap 175e to cover the upper surface 175b with the resin portion 161a and form an embedded portion 165b on the upper surface 175b. The upper surface of the embedded portion 165b is flush with the upper surface of the front metal frame portion 155, and the front surface of the embedded portion 165b is flush with the front end surface 155a of the front metal frame portion 155 and the front end surface 165a of the front frame portion 165. Because the rest of the configuration is identical to the subsiding portion 175 shown in FIG. 8, further explanation has been omitted.

Figure 12:
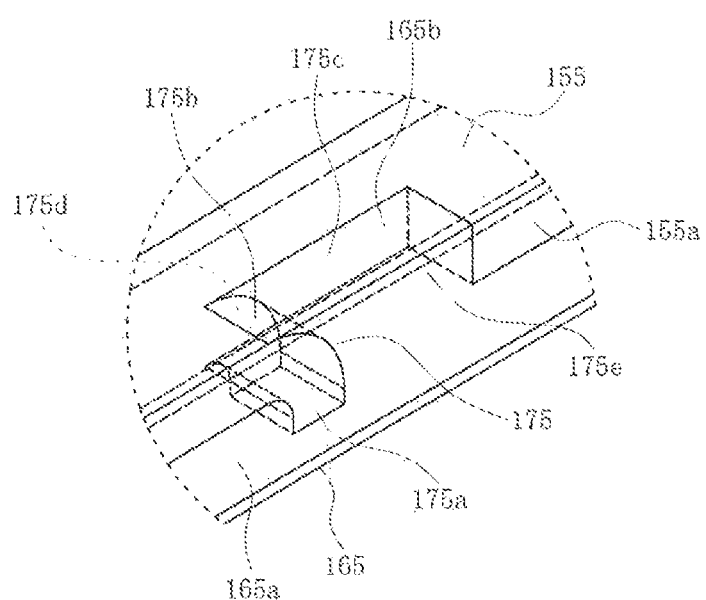
FIG. 12 is a partially enlarged view of the subsiding portion of the card tray in a fourth variation on the first embodiment of the present disclosure, as compared to FIG. 8.
Figure 13A:
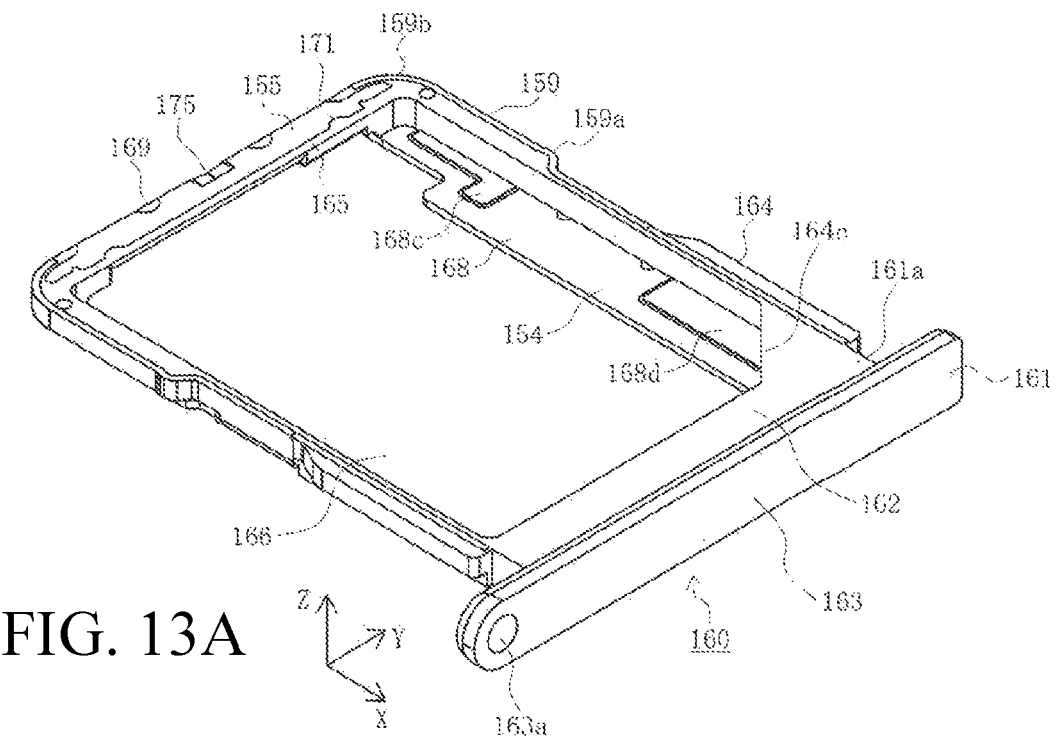
Figure 13B:
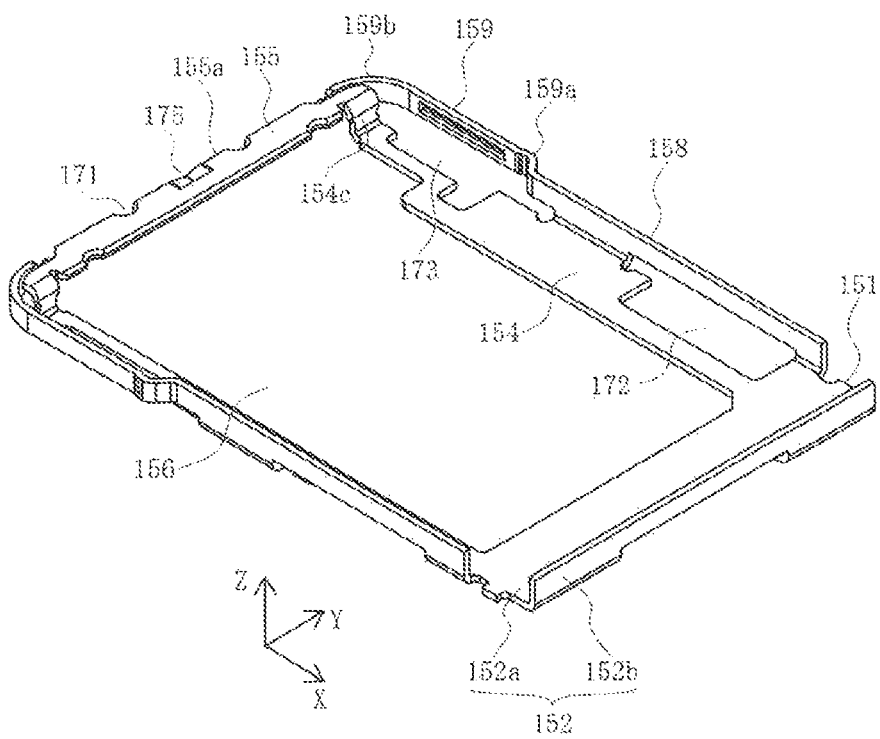
Figures 14A, 14B, 14C:
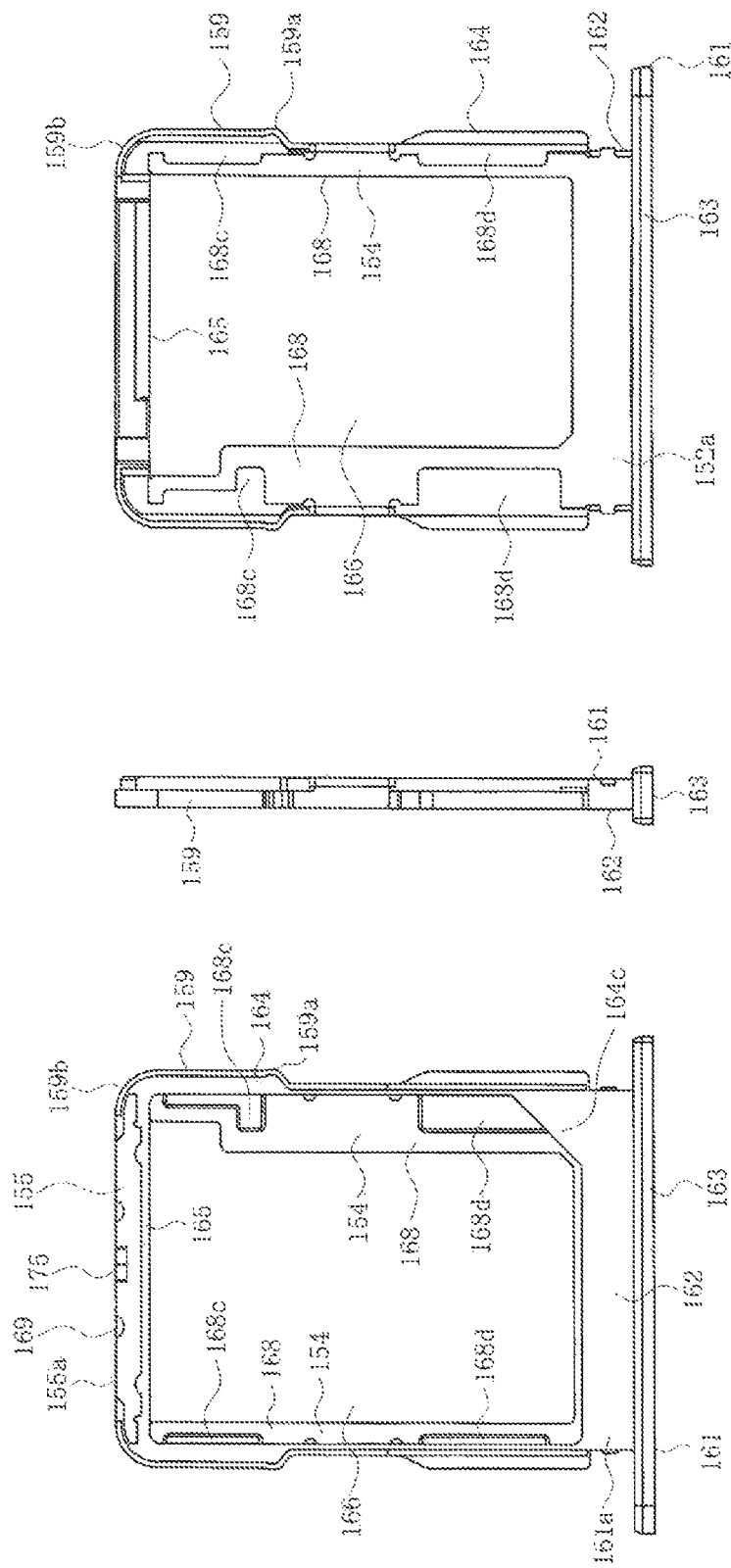
Figure 16A:
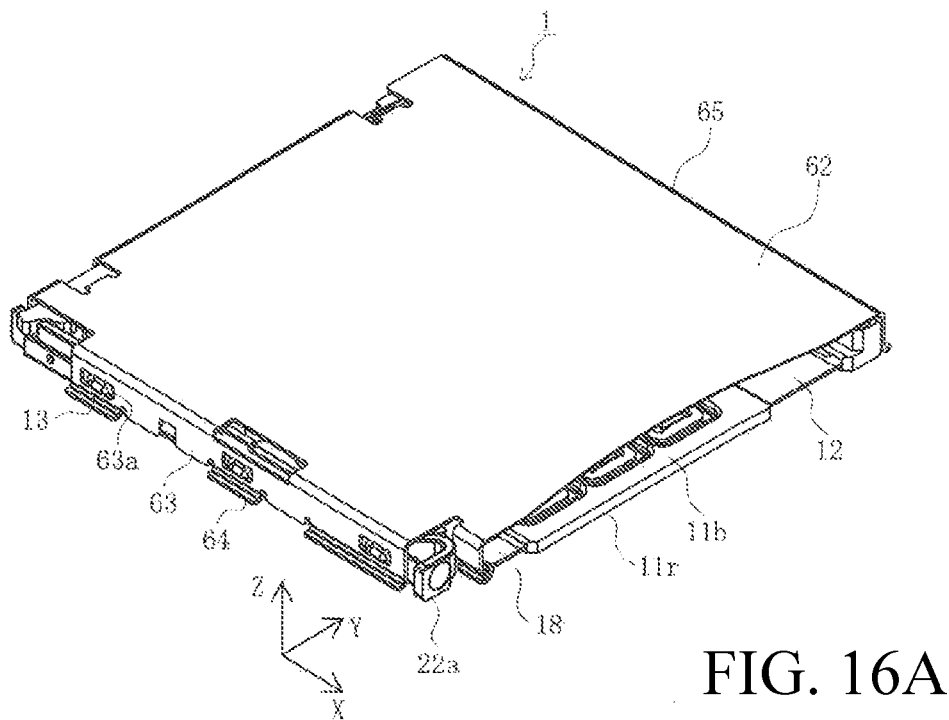
Figure 16B:
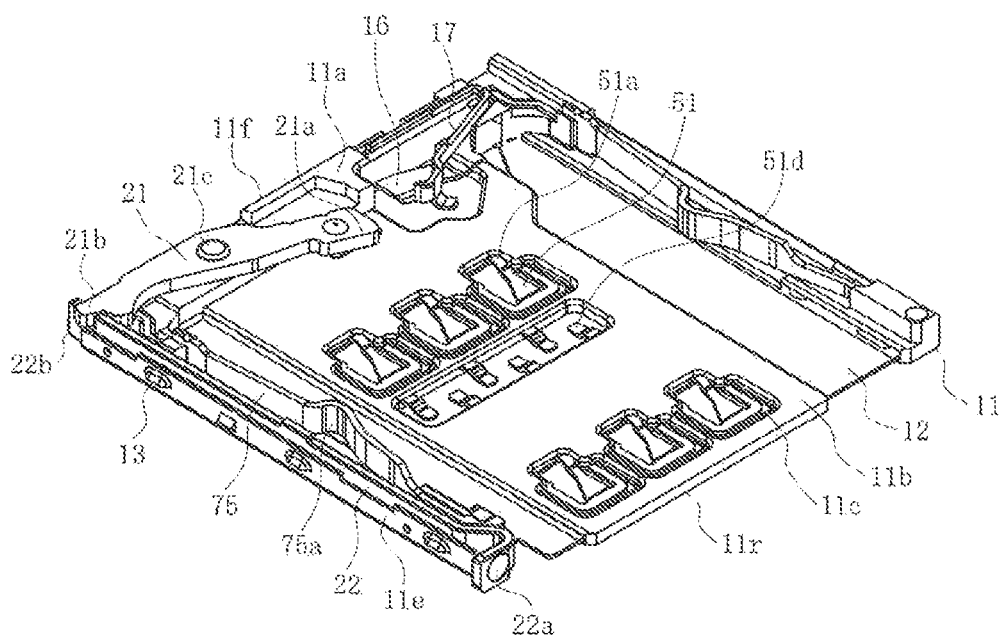
Figure 17:
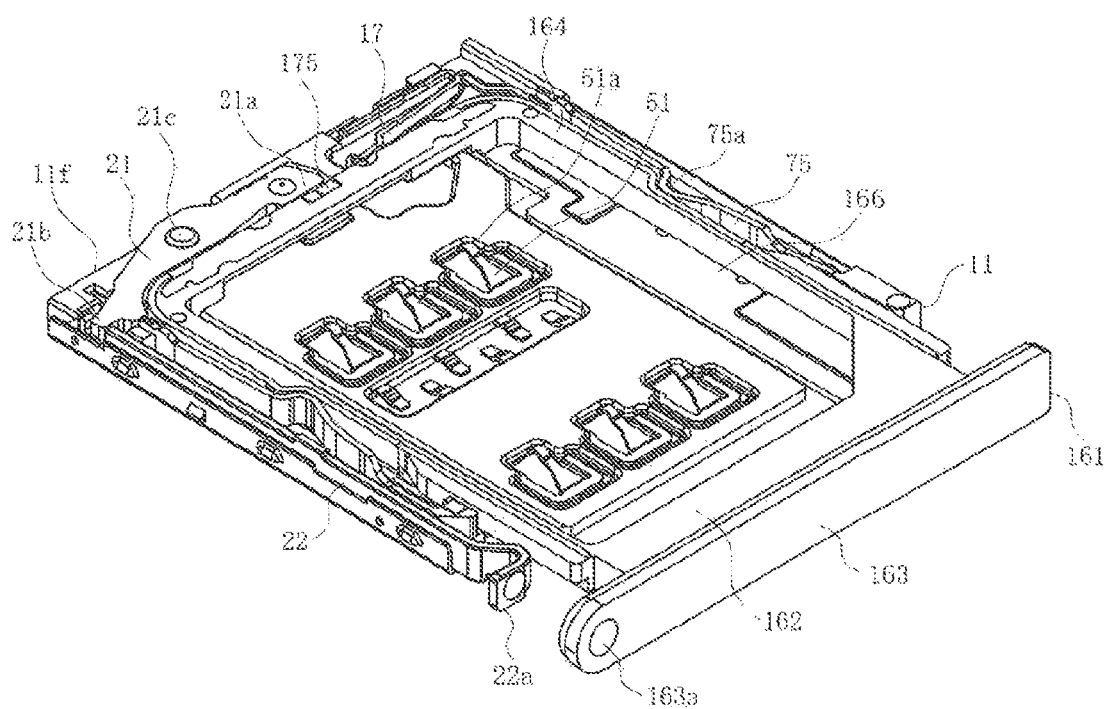
FIG. 17 is a perspective view of a card tray inserted into the card connector in the second embodiment of the present disclosure (with the shell removed).
Figure 18:
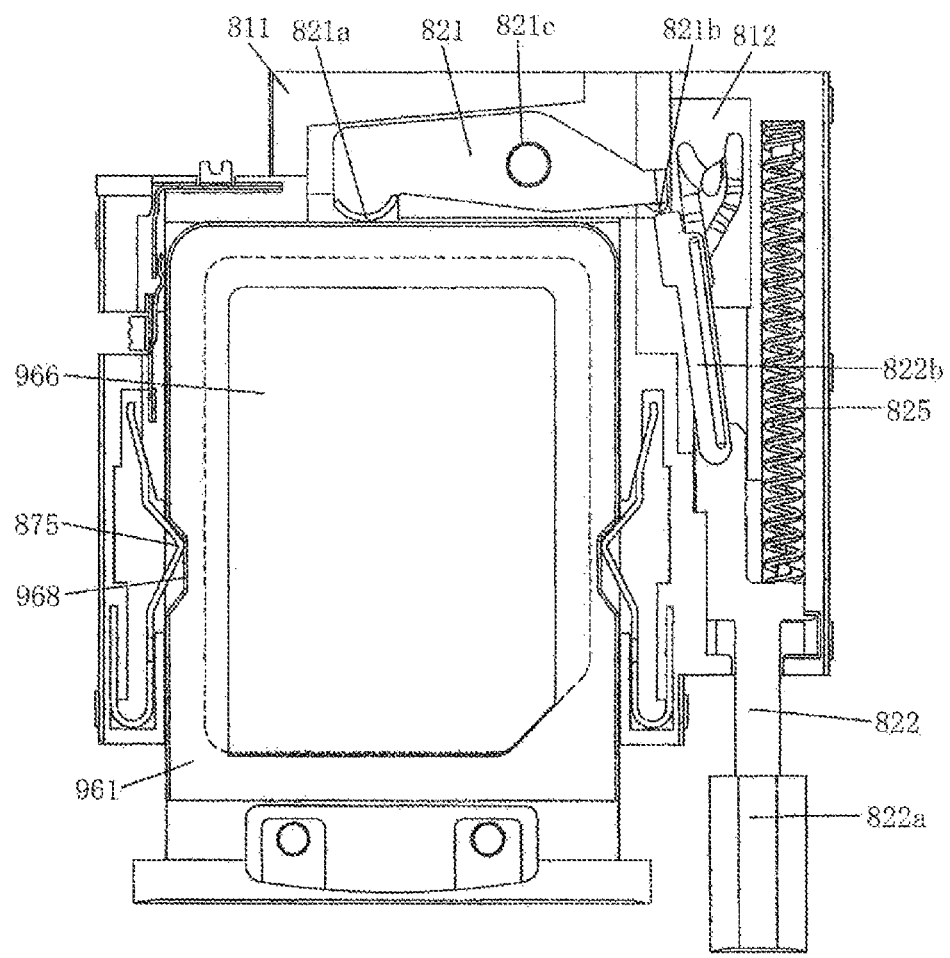
FIG. 18 is a diagram showing a card connector of the prior art.

The subsiding portion 175 shown in FIG. 12, which is the fourth variation, has an L-shaped curved portion for downward inclined insertion from a base end (the left end in the example shown in the drawing) to the leading end (the right end in the example shown in the drawing) when viewed from the front. The base end is connected to the front metal frame portion 155 and the leading end is cut off from the front metal frame portion 155, and a gap 175e is formed between the leading end and the front metal frame portion 155. In other words, a gap 175e is present between the upper surface 175b and the upper surface of the front metal frame portion 155. Some of the resin portion 161a formed using a molding method such as insert molding or overmolding is applied to the gap 175e to cover the upper surface 175b with the resin portion 161a and form an embedded portion 165b on the upper surface 175b. The upper surface of the embedded portion 165b is flush with the upper surface of the front metal frame portion 155, and the front surface of the embedded portion 165b is flush with the front end surface 155a of the front metal frame portion 155 and the front end surface 165a of the front frame portion 165. Because the rest of the configuration is identical to the subsiding portion 175 shown in FIG. 8, further explanation has been omitted.

In the present embodiment, the card tray 160 is able to hold a card with electrode pads and is able to be inserted into a card connector 1. The card tray 160 comprises a frame portion 161 containing a front frame portion 165 positioned in the front of the card tray 160 in the direction of insertion into the card connector 1 and side frame portions 164 connected on both ends to the front frame portion 165. The frame portion 161 includes a metal portion 151 composed of a metal panel and a resin portion 161a covering at least some of the periphery of the metal portion 151, and the metal portion 151 includes a front metal frame portion 155. The front end surface 155a of the front metal frame portion 155 is exposed on the front end surface 165a of the front frame portion 165, and the front metal frame portion 155 includes a subsiding portion 175. The front surface 175a of the subsiding portion 175 is flush with the front end surface 155a of the front metal frame portion 155, and includes a section displaced from the front end surface 155a in the thickness direction of the front frame portion 165.

Therefore, the front frame portion 165 is strong and the front frame portion 165 does not become worn or damaged even when the force output portion 21a subjects it to strong force. Because the metal portion 151 is covered by the resin portion 161a, the card does not become short-circuited. As a result, the card is highly reliable.

Also, the rear surface 175d of the subsiding portion 175 is parallel to the front surface 175a and subsides into the resin portion 161a of the front frame portion 165. This has an anchoring effect that more securely integrates the front metal frame portion 155 and the front frame portion 165.

The upper surface 175b of the subsiding portion 175 subsides from the upper surface of the front metal frame portion 155. Therefore, the range in which the front surface 175a of the subsiding portion 175 extends vertically is greater than the range in which the front end surface 155a of the front metal frame portion 155 excluding the subsiding portion 175 extends vertically. As a result, the force output portion 21a of the ejection lever 21 abuts the front surface 175a of the subsiding portion 175 even when the force output portion 21a is lower than the front end surface 155a of the front metal frame portion 155.

The following is an explanation of a second embodiment of the present disclosure. The configurational elements identical to those in the first embodiment are denoted by the same reference numbers and further explanation of these configurational elements has been omitted. Because the operations and effects are the same as those of the first embodiment, further explanation of these has been omitted.

The card tray 160 in the present embodiment, unlike the first embodiment, has a single space 166 for accommodating a card which is not divided into a first space 166a and a second space 166b. Therefore, the frame portion 161 of the card tray 160 in the present embodiment does not include a middle frame portion 167. Also, the side frame portions 164 are not divided into a first side frame portion 164a and a second side frame portion 164b, and the eaves portions 168 are not divided into a first eaves portion 168a and a second eaves portion 168b.

Similarly, the metal portion 151 in the present disclosure has a single opening 156 which is not divided into a first opening 156a and a second opening 156b. Therefore, the metal portion 151 in the present embodiment does not include a middle metal frame portion 157. In addition, the metal side frame portions 154 are not divided into a first metal side frame portion 154a and a second metal side frame portion 154b, and the metal side wall portions 158 are not divided into a first metal side wall portion 158a and a second metal side wall portion 158b.

In the explanation of the present embodiment, the card housed inside the space 166 is a nanoSIM card.

In the card tray 160 of the present embodiment, some of the metal portion 151 is exposed inside the space 166. More specifically, the metal side frame portions 154 are extended farther into the space 166 to form eaves portions 168. In addition, the first anchoring opening 172 and the second anchoring opening 173 are larger and extend into the eaves portions 168 and the space 166. Some of the resin portion 161a entering the first anchoring opening 172 and the second anchoring opening 173 form a first island portion 168d and a second island portion 168c, and the upper surfaces of the first island portion 168d and the second island portion 168c are positioned above the upper surfaces of the metal side frame portions 154.

Therefore, even when the electrode pads on the bottom surface of the card housing inside the space 166 make contact with the upper surfaces of the first island portion 168d and the second island portion 168c made of an insulating resin, they do not make contact with the metal side frame portions 154. Also, the side surfaces of the side frame portions 164 and the front frame portion 165 inside the space 166, that is, the inner side surfaces, are completely covered with an insulating resin and the metal portion 151 is not exposed. In this way, even when the edges of the electrode pads on the bottom surface of the card housing inside the space 166 are exposed to the side surfaces of the card, they do not come into contact with the metal portion 151 at any point.

The rear metal frame portion 152 of the metal portion 151 in the present embodiment includes a flat portion 152*a* extending on the same plane as the metal side frame portions 154 and a vertical wall portion 152*b* extending in the Y-Z direction and curving upwards so as to become orthogonal to the flat portion 152*a*. The lower surface of the flat portion 152*a* is exposed and flush with the lower surface of the rear frame portion 162, and the vertical wall portion 152*b* is embedded inside the rear panel portion 163.

Because the rest of the configuration of the card tray 160 is identical to the one in the first embodiment, further explanation has been omitted.

The card connector 1 in the present embodiment, unlike the one in the first embodiment, only has first terminals 51 and no second terminals 52 or third terminals 53 as connecting terminals. Therefore, the bottom wall portion 11*b* of the housing 11 in the present disclosure only has primary terminal holding recessed portions 11*c* and no secondary terminal holding recessed portions 11*d* or tertiary terminal holding recessed portions 11*g*.

In the present embodiment, the movable member 17 and the fixed member 16 of the detection switch are separated from each other when the card tray 160 has not yet reached a predetermined position and come into contact with each other when the card tray 160 reaches the predetermined position. In this way, the present embodiment differs from the first embodiment.

In every other respect, the configuration of the card connector 1 in the present embodiment is identical to that of the first embodiment. Therefore, further explanation has been omitted. The operations of the card connector 1 in the present embodiment are identical to those of the first embodiment. Therefore, further explanation has been omitted. The effects of the present embodiment are identical to those of the first embodiment. Therefore, further explanation has been omitted.

The present disclosure is not limited to the embodiments described above. Many modifications and variations are possible without departing from the spirit and scope of the present disclosure.

The present disclosure can be applied to a card holding member and to a card connector.

The invention claimed is:

1. A card holding member which is configured to hold a card with terminal members and which is configured to be inserted into a card connector, the card holding member comprising:
a frame portion having a front frame portion positioned in a front of the card holding member and side frame portions connected to opposite ends of the front frame portion, the front frame portion including a metal portion composed of a metal panel and a resin portion covering at least some of a periphery of the metal portion, wherein a front end surface of the metal portion is exposed at a front end surface of the front frame portion, and wherein the metal portion includes a subsiding portion, a front surface of the subsiding portion being flush with the front end surface of the metal portion and including a section displaced from the front end surface of the front frame portion.

2. The card holding member according to claim 1, wherein a rear surface of the subsiding portion is parallel to the front surface of the subsiding portion and subsides into the resin portion of the front frame portion.

3. The card holding member according to claim 1, wherein an upper surface of the subsiding portion subsides from an upper surface of the metal portion.

4. The card holding member according to claim 3, wherein the upper surface of the subsiding portion is a connecting surface which is connected to the upper surface of the metal portion.

5. The card holding member according to claim 4, wherein the upper surface of the subsiding portion is not covered by the resin portion.

6. The card holding member according to claim 5, wherein the metal portion includes a boundary surface which is connected to a rear end of the upper surface of the subsiding portion.

7. The card holding member according to claim 3, wherein a gap is formed in the upper surface of the subsiding portion.

8. The card holding member according to claim 7, wherein the upper surface of the subsiding portion is covered by the resin portion.

9. A card connector able to receive the card holding member according to claim 1, the card connector having an abutting portion for abutting the front surface of the subsiding portion.

10. The card connector according to claim 9, wherein the abutting portion is a force output portion of an ejecting member in an ejection mechanism for ejecting the card holding member.

11. The card holding member according to claim 3, wherein a gap is formed between the upper surface of the subsiding portion and the upper surface of the metal portion.

12. The card holding member according to claim 11, wherein the upper surface of the subsiding portion is covered by the resin portion.

* * * * *